United States Patent Office 3,528,007
Patented Sept. 8, 1970

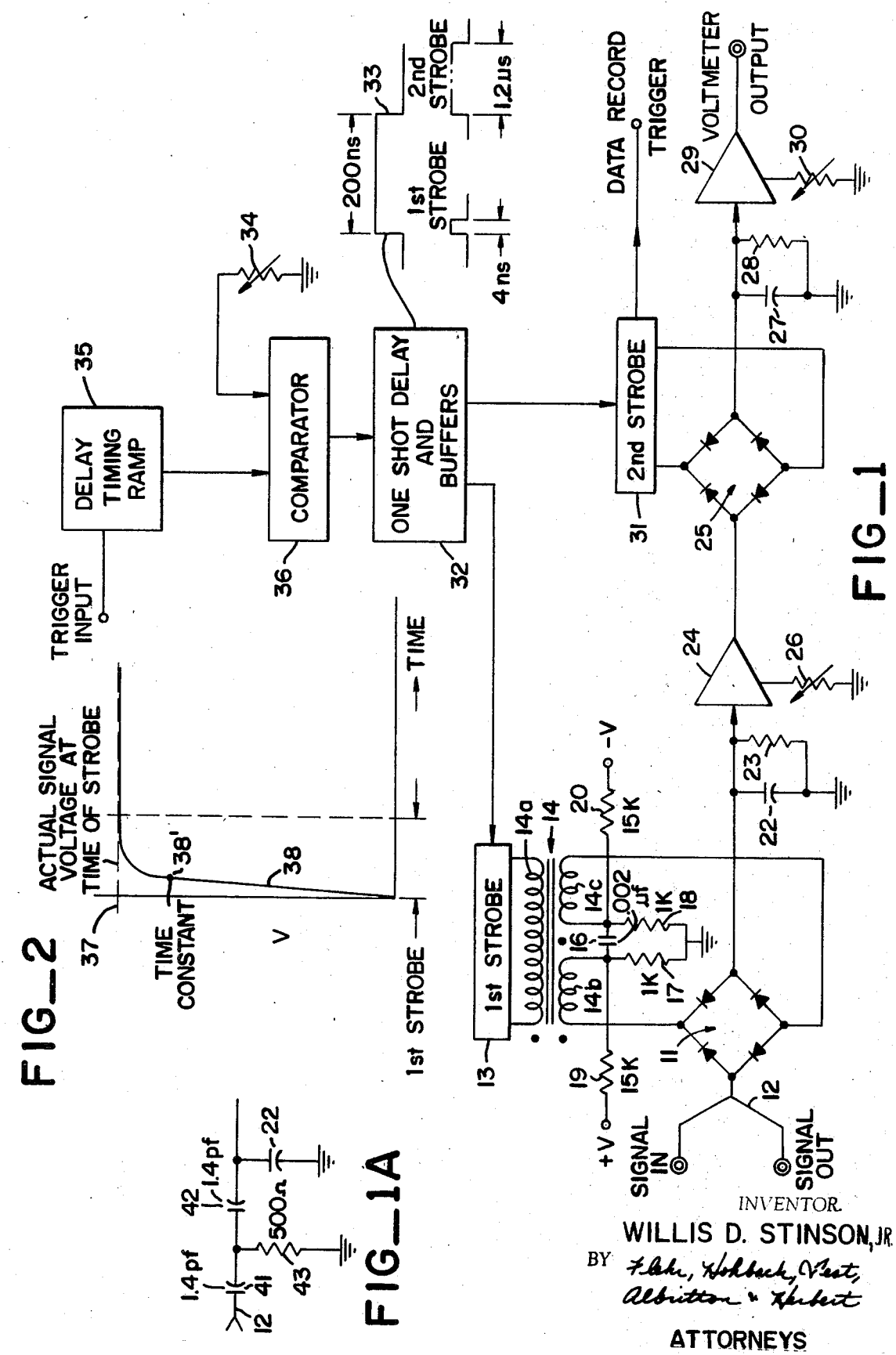

3,528,007
SINGLE-SHOT STROBING VOLTMETER
Willis D. Stinson, Jr., Oakland, Calif., assignor to E-H Research Laboratories, Inc., Oakland, Calif., a corporation of California
Filed Feb. 27, 1968, Ser. No. 708,578
Int. Cl. G01r 1/00
U.S. Cl. 324—111       6 Claims

ABSTRACT OF THE DISCLOSURE

A strobing voltmeter which has a single-shot measurement capability. A sampled signal is coupled into a first memory having a shunt capacitor of low value; a relatively broad strobe pulse allows the capacitor to charge to the full value of the signal voltage during a single sample interval. Thereafter, a second diode bridge couples the first memory to a second capacitor memory to transfer the amplitude information. The second memory has a long discharge time to enable output utilization means to sense the sampled amplitude.

BACKGROUND OF THE INVENTION

The present invention is directed in general to a strobing voltmeter and more specifically to such a voltmeter which is suitable for single-shot measurements.

In the testing of solid state devices, increasing device sophistication and high speed performance have complicated testing procedures. With the advent of more complex multiport arrays it is necessary to provide for automated testing. Moreover, the actual measurement must be capable of analyzing the dynamic capabilities of the device under test.

Present methods of testing are usually repetitive in nature where several test waveforms must be processed for a single test. They are unduly time consuming and may not provide an accurate indication of the circuit under actual operating conditions. Such testing is better met by a single-shot measurement. However, present testing devices do not have the capability of making single-shot measurements at high frequencies.

In the prior art where repetitive type testing is used, the sampled test signal is coupled to a capacitor which is only partially charged during a single strobe pulse interval. For example, the partial charge might amount to 25% of the final input signal amplitude or magnitude. An amplifier is coupled to the memory capacitor and a delayed feedback (to prevent oscillation) coupled from the amplifier output back to the capacitor provides the other 75% of the final amplitude. In this prior art device the strobe pulse duration could thus be relatively short since the memory capacitor was charged only to 25% of its value; thus, the frequency bandwidth, which is related to the width of the strobe pulse, could be maximized.

Since the above technique utilizes a feedback loop it is null seeking in nature and may require many samples of the test signal; for example, ten samples to zero in on the correct value. In actual practice, the amount of feedback is adjusted to provided a correct value for one sample assuming, however, a constant value of strobe width, source impedance, and loop gain. If any of the above parameters change, the output will be correct only after several samples have been taken to allow the circuit to zero in, as discussed above. Thus, it is apparent that for single-shot measurements this system is unusable from a practical standpoint.

Another problem in prior art testing devices is that of "blowby" in sampling circuits. Normally, diode switching bridges are used and the diodes of these bridges have a finite capacity. Blowby is the result of the finite capacitance of a bridge which allows a charging input signal to be coupled through the gate even though it is in an open circuit condition. One solution to this problem has been to ignore it since it contributes perhaps a one percent error to the output; another solution has been to null the bridge capacity with another capacitor coupled to a differential input. The first approach results in an inaccurate output and the second provides only an approximate solution.

Lastly, another problem is the recovery time of the diodes used in the bridge circuits. Since the diodes store a finite amount of charge depending on the pulse repetition frequency rate of the strobe pulses, they also have a finite recovery time. In prior art devices, a base line shift was caused by changing repetition rates since the diodes did not completely recover after each sample.

OBJECTS AND SUMMARY OF THE INVENTION

It is therefore a general object of the invention to provide an improved strobing voltmeter.

It is another object of the invention to provide a strobing voltmeter having a single-shot measurement capability.

It is another object of the present invention to provide a strobing voltmeter as above having improved high frequency performance.

It is another object of the present invention to provide a strobing voltmeter which minimizes blowby, gain changes due to variations in either strobe width, source impedance or loop gain and base line shift due to the effects of diode recovery time.

In accordance with the above objects there is provided a strobing voltmeter for indicating the amplitude of a portion of a test signal selected by a strobe pulse of predetermined time duration. The voltmeter comprises a first memory including first charge storage means having a predetermined time constant. This memory is responsive to the strobe pulse for causing the first storage means to store the full amplitude of the selected test signal portion during a single strobe pulse. A second memory is coupled to the first memory and also includes second charge storage means having a time constant of at least an order of magnitude longer than the time constant of the first integrating means. Gate means responsive to the cessation of the strobe pulse, couples the second memory to the first memory thus causing the second storage means to store the amplitude of the signal portion.

BRIEF DESCRIPTION OF THE DRAWINGS

FIG. 1 is a block diagram of a strobing voltmeter embodying the present invention;

FIG. 1A is an equivalent circuit of a portion of FIG. 1; and

FIG. 2 is a curve useful in understanding the present invention.

DESCRIPTION OF THE PREFERRED EMBODIMENT

Referring now to FIGS. 1 and 2 of the drawing, an input signal to be tested is applied to a diode bridge gate 11. Normally, the input signal is supplied through a 50 ohm feedthrough signal line 12. Diode gate 11 is opened and closed by a strobe pulse from a strobe generator 13 designated "1st strobe."

Strobe generator 13 is coupled to gate 11 through a transformer 14 having a primary winding 14a connected to the generator and secondary windings 14b and 14c each having one terminal coupled to the gate. Windings 14b and 14c are coupled together by an AC coupling capacitor 16 to provide a one-to-one turns relationship between the primary and coupled secondary windings. The secondary windings are coupled to ground through respective resistors 17 and 18 and coupled to voltage sources, +V and —V, through resistors 19 and 20. The values of resistors 17–20 are indicated in ohms.

Gate 11 is coupled to charge storage means 22 which, in the form shown, is a capacitor. A parallel connected resistor 23 provides for substantially complete discharge of the capacitor between samples.

Capacitor 22 and the output of gate 11 are coupled to an amplifier 24 having provision for a zero adjustment 26. The output of amplifier 24 is coupled to a second diode gate 25 which couples the amplitude represented by the stored charge of capacitor 22 to a second memory capacitor 27. This capacitor is shunted by a resistor 28. Both the resistor and capacitor are coupled to the input of an amplifier 29 having a zero adjustment 30 which cancels any offset voltage which may be present. The output of amplifier 29 is the final output of the strobing voltmeter.

Gate 25 is opened to complete the circuit by a second strobe 31 which occurs a predetermined time after the first strobe 13 has ended. Such timing is provided by one-shot delay and buffers 32 which provide a one-shot delay pulse 33 of 200 nanoseconds. On the leading edge of the pulse the first strobe is generated having a time duration of four nanoseconds. On the trailing edge of pulse 33 a second strobe is generated having a duration of 1.2 microseconds. Thus, there is slightly less than a 200 nanosecond time delay between the first and second strobe pulses. This allows amplifier 24 adequate time to settle on the stored amplitude of capacitor 22.

Resistor 28 is relatively large so that the decay time of the resistance capacitance circuit 27, 28 is sufficient for a utilization device to record the voltmeter output. Its charging time constant, however, is relatively short since it is dependent only on the output impedance of amplifier 24 and bridge 25. This allows for a rapid transfer of information from the first to the second memory.

Second stroke 31 has a data record trigger output which occurs two microseconds after the second strobe pulse and indicates to a recording device that the voltmeter output can be recorded.

The precise point on the time axis of the test signal which is to be measured is determined by a delay timing ramp 35 which is initiated by a trigger output. When the ramp reaches a predetermined voltage level as determined by a potentiometer input 34, a comparator 36 initiates the one-shot delay 32. Thus, by control of potentiometer 34 a specific point on a test signal waveform can be measured.

FIG. 2 illustrates the one-shot capability of the strobing voltmeter of the present invention. The horizontal line 37 indicates the actual signal voltage at the time of the first strobe pulse. The time duration of the first stroke pulse is indicated on the horizontal time axis. Curve 38 shows the change of voltage magnitude on capacitor 22. The point 38' indicates the time constant of this curve considering its shape as being dependent on the capacitance value of capacitor 22 and the output impedance of the signal source in conjunction with the impedance of bridge 11. This output impedance is actually the characteristic impedance of feedthrough cables 12. To prevent reflection these cables must be electrically longer than ½ the width of the first strobe pulse. The curve aptly illustrates the 100% sampling efficiency of the present invention in that because of the small time constant in combination with relatively large strobing pulse time duration almost the full amplitude of the test signal is stored in one strobe pulse. In practice, it has been found that the strobe pulse time duration should be at least five times the time constant of the first charge storage means which includes capacitor 22.

On the other hand, the second memory which includes capacitor 27 and amplifier 29 must store the signal of the first memory a sufficient amount of time for a utilization device to read this signal. Thus, the decay time of capacitor 27 and resistor 28 is relatively long.

In accordance with the invention the single-shot capability of the strobing voltmeter is enhanced by eliminating the deleterious effects of gain changes (which are important in systems using a feedback loop) by providing for substantially complete charging of capacitor 22 in a single strobe pulse. Thus, changes in, for example, source impedance during a measurement are relatively inconsequential. Single-shot capability is also enhanced by the provision of shunt resistor 23 which allows capacitor 22 to completely discharge between samples and which also discharges any input capacity of amplifier 24.

From another aspect the base line shift produced by the inherent diode recovery time due to the finite stored charge of the diodes in bridge 11 is minimized. The base line is maintained relatively stable by providing a repetition rate for the sampling pulse which is low enough for all the diodes to recover. In actual practice a rate of 1 kHz. is adequate. This low sampling repetition rate still enables the present invention to have a high data rate since only a single sample need be taken as opposed to the several samples necessary in the prior art. Thus, the data rate is equal to the sampling rate.

As discussed above, blowby is, of course, the result of the finite capacitance of bridge 11 which allows an input signal to couple through directly to the second memory capacitor 27 when gate 25 is open even though the first gate 11 is closed theoretically uncoupling the circuit. The equivalent circuit of the bridge 11 and associated circuitry is shown in FIG. 1A where the finite capacity of the diode bridge 11 is shown by capacitors 41 and 42 and resistors 17 and 18 are illustrated by the equivalent resistor 43. The relatively low value of equivalent resistor 43 will discharge capacitors 41 and 42 in less than one nanosecond assuming the values as shown on the components.

Blowby is minimized by the differentiation circuit including capacitor 41 and resistor 43 which differentiates this input signal at the driving point of bridge 11 with a time constant of substantially less than one nanosecond. The short spike produced by this differentiation is then coupled into the capacitor 27 which has a relatively long integration time of substantially 150 nanoseconds. Thus, the contribution of the final blowby signal to the output signal is insignificant after being differentiated and integrated in this manner where the integration is much longer than the differentiation.

The circut of the present invention has been constructed with the following component values and circuit characteristics:

Capacitor 22—10 picofarads
Stray capacitance at input of amplifier 24—4 picofarads
Resistor 23—5 megohms
Time constant relative to charging of capacitor 22 with cable impedance of 25 ohms (two 50 ohm lines in parallel) and bridge 11 impedance of 10 ohms—½ nanosecond
Decay time of capacitor 22—70 microseconds
Capacitor 27—2500 picofarads
Resistor 28—100 megohms
Decay time of capacitor 27—250 milliseconds
Time constant relative to charging of capacitor 27 with output impedance of amplifier 24 of 50 ohms and bridge impedance 25 of 10 ohms—150 nanoseconds With the above components the signal channel is capable of single-shot measurements of pulse waveforms with widths of less than 5 nanoseconds. For sucessive measurements a data rate of 1 kHz. is obtainable.

Thus, in conclusion, the improved strobing voltmeter of the present invention provides for one-shot measuring by reducing the shunt capacitance of capacitor 22 of the first memory to a minimum and using a relatively broad first strobe pulse so that this capacitor charges to very nearly the final value of the actual signal voltage during the strobe. No feedback is required to pull the charge up artificially. The base line shift is eliminated.

What I claim is:

1. A strobing voltmeter for indicating the amplitude of a portion of a test signal comprising, a first memory including first charge storage means having a predetermined charging time constant; means for generating a strobe pulse for selecting said portion of said test signal which is at least five times longer than said time constant of said first charge storage means; for causing said first storage means to store the full amplitude of a selected test signal portion during a single strobe pulse, a second memory coupled to said first memory including second charge storage means having a decay time constant at least an order of magnitude longer than said charging time constant of said first storage means, gate means responsive to the cessation of said strobe pulse for coupling said second memory to said first memory, whereby said second storage means stores said amplitude of said test signal portion.

2. A strobing voltmeter as in claim 1 including discharge means coupled to said first storage means for substantially completely discharging said storage means after the cessation of said strobe pulse.

3. A strobing voltmeter as in claim 2 in which said discharge means is a shunt connected resistor.

4. A strobing voltmeter as in claim 1 together with a diode gate responsive to said strobe pulse for coupling said test signal to said charge storage means, the diodes of said gate having a finite recovery time, and together with means for generating said strobe pulses at a repetition rate sufficiently low to allow said diodes to recover between said pulses.

5. A strobing voltmeter as in claim 1 together with a diode gate responsive to said strobe pulse for coupling said test signal to said charge storage means, the diodes of said gate having a finite capacity, and together with means coupled to said diode gate for discharging said diodes said discharge means providing differentiation of said input signal during closed conditions of said gate and said second charge storage means providing for integration of such differential signal over a time period substantially longer than said differentiation whereby blowby is minimized.

6. A strobing voltmeter as in claim 1 where said first charge storage means includes a capacitor coupled to a diode gate and an input cable having a characteristic impedance said charging time constant being determined by the value of said capacitor and the combined impedance of said cable and diode gate.

References Cited

UNITED STATES PATENTS

| | | | |
|---|---|---|---|
| 2,615,934 | 10/1952 | Mackta | 324—111 |
| 3,411,018 | 11/1968 | Dapper et al. | 328—151 XR |
| 3,412,331 | 11/1968 | Boatwright et al. | 324—120 |

ALFRED E. SMITH, Primary Examiner

U.S. Cl. X.R.

328—151